United States Patent [19]

Scherch et al.

[11] Patent Number: 5,687,626
[45] Date of Patent: Nov. 18, 1997

[54] FOOD PRODUCT SLICER HAVING AN INTERLOCK MECHANISM

[75] Inventors: Richard P. Scherch, Johnston, Iowa; Timothy Allen Schrand, Oregonia; Ellis Gale Short, Wapakoneta, both of Ohio

[73] Assignee: Premark FEG L.L.C., Wilmington, Del.

[21] Appl. No.: 573,073

[22] Filed: Dec. 15, 1995

[51] Int. Cl.⁶ .................................................. B26D 7/22
[52] U.S. Cl. ........................... 83/719; 83/730; 83/932; 83/DIG. 1
[58] Field of Search ...................... 83/859, 860, 544, 83/440.2, 444, 730, 729, 717, 719, DIG. 1, 319, 397, 397.1, 932, 399, 703, 707

[56] References Cited

U.S. PATENT DOCUMENTS

| | | | |
|---|---|---|---|
| 1,518,474 | 12/1924 | Wile . | |
| 2,004,603 | 6/1935 | Folk | 83/729 |
| 2,010,944 | 8/1935 | Campbell | 83/717 |
| 2,086,759 | 7/1937 | Wood | 83/544 |
| 2,136,792 | 11/1938 | Folk | 83/730 |
| 2,402,519 | 6/1946 | Wood . | |
| 2,573,860 | 11/1951 | Meeker et al. . | |
| 2,744,554 | 5/1956 | King . | |
| 2,970,623 | 2/1961 | Lundell . | |
| 3,159,196 | 12/1964 | Engi . | |
| 3,704,736 | 12/1972 | Pratley | 83/397 |
| 3,927,588 | 12/1975 | Laderach | 83/15 |
| 3,972,256 | 8/1976 | Ross | 83/155 |
| 3,974,725 | 8/1976 | Boots | 83/100 |
| 4,070,941 | 1/1978 | Lorenz | 83/478 |
| 4,217,650 | 8/1980 | Kuchler . | |
| 4,246,818 | 1/1981 | McGraw, Jr. | 83/478 |
| 4,295,287 | 10/1981 | Natzke et al. . | |
| 4,318,321 | 3/1982 | De Mattos | 83/71 |
| 4,379,416 | 4/1983 | Kuchler | 83/23 |
| 4,397,206 | 8/1983 | Czala | 83/399 |
| 4,541,319 | 9/1985 | Maurer et al. | 83/707 |
| 4,598,618 | 7/1986 | Kuchler | 83/77 |
| 4,598,620 | 7/1986 | Flammann | 83/397 |
| 4,685,364 | 8/1987 | Scheflow et al. | 83/68 |
| 4,763,738 | 8/1988 | Kuchler . | |
| 4,813,316 | 3/1989 | Johnson et al. | 83/42 |
| 5,121,554 | 6/1992 | Havins | 83/471.3 |
| 5,241,885 | 9/1993 | Kuchler | 83/76.7 |
| 5,245,898 | 9/1993 | Somal et al. | 83/58 |
| 5,615,591 | 4/1997 | Scherch et al. | 83/399 |

FOREIGN PATENT DOCUMENTS

| | | |
|---|---|---|
| 1196985 | 7/1965 | Germany . |
| 2749652 | 11/1977 | Germany . |
| 3201520 | 7/1983 | Germany ............... 83/730 |

*Primary Examiner*—Eugenia Jones
*Assistant Examiner*—Charles Goodman
*Attorney, Agent, or Firm*—Thompson Hine & Flory LLP

[57] ABSTRACT

An interlock mechanism for a food product slicer that prevents the carriage support of a reciprocating carriage from being removed from the slicer housing unless the gauge plate of the slicer is closed and the carriage is positioned along a predetermined portion of the path of reciprocation of the carriage. The interlock mechanism includes a pivoting interlock plate and a stationary interlock bar. The pivoting interlock plate extends along the predetermined portion of the reciprocation path and the stationary interlock bar extends along the rest of the carriage's reciprocation path. The interlock plate is pivotally mounted on the housing and is movable from a blocking position, which it blocks pivoting and removal of a carriage support, to a free position, which it permits pivoting and removal of the carriage support. The interlock plate cooperates with the gauge plate adjustment control mechanism such that when the gauge plate is adjusted to an open position, the interlock plate is pivoted to the blocking position, and when the gauge plate is adjusted a closed position, the interlock plate is pivoted to the free position. Because the stationary bar is always in a blocking position, blocking the pivoting and removal of the carriage support, the carriage support can never be pivoted or removed when the carriage is positioned in the portion of the reciprocation path covered by the bar.

11 Claims, 8 Drawing Sheets

FOOD PRODUCT SLICER HAVING AN INTERLOCK MECHANISM

BACKGROUND OF THE INVENTION

The present invention relates, in general, to a food product slicer and, in particular, to a food product slicer having an interlock device which allows the food product carriage tray and supporting leg to be removed for cleaning only when the gauge plate is closed and prevents opening of the gauge plate while the carriage tray and leg are removed from the slicer.

Commercial food product slicers are widely utilized as rapid and effective means of slicing meat, cheese, vegetables and other food products. These machines commonly include a motor driven circular slicing blade having a peripheral cutting edge and a carriage which passes the food product over the blade. To adjust the thickness of the slice, these machines include a gauge plate which is adjusted in relation to the slicing blade to set the slice thickness. Because of the nature of these machines, food and fat debris often build up on the gauge plate and carriage. For that reason, both the product carriage and the gauge plate must be frequently cleaned to maintain the slicer.

To facilitate cleaning of the carriage and gauge plate of a conventional food product slicer, slicers have been designed which have a carriage that can either be removed from the housing or be pivoted away from the cutting deck of the machine. Once the carriage is moved away from the body of the slicer, the edge of the slicing blade near the gauge plate becomes exposed if the gauge plate is in the open position. This exposed slicing blade, because it is razor sharp, can cut the operator if the operator were to inadvertently contact the blade edge.

To prevent the operator from contacting the edge of the blade, food product slicers have been designed with interlock devices which prevent the carriage from being removed from the slicing machine unless the gauge plate is closed, i.e., adjusted to a position approximately coplanar with the slicing blade, and which provide coverage of the blade edge while the carriage tray is moved away from the slicer housing. For example, U.S. Pat. No. 4,541,319 to Maurer, et al. describes an interlock device for a meat slicing machine. The carriage of this meat slicer can be pivoted away from the machine when the gauge plate is closed. The carriage articulates a slider member. When the gauge plate is open, a stop on the slider member engages a counter stop member on the carriage thereby preventing the carriage from being pivoted.

SUMMARY OF THE INVENTION

The present invention is directed to an interlock mechanism for a food product slicer which prevents the carriage from being removed from the slicer housing unless the gauge plate is closed. The slicer comprises a housing, a gauge plate, a food product carriage, an interlock mechanism and other conventional parts. The slicing blade is circular and is mounted on a drive shaft. The drive shaft is driven by a motor housed in the housing. The gauge plate is adjusted relative to the slicing blade to set the thickness of a particular slice. The gauge plate is adjusted by an adjustment means which moves the gauge plate from a closed position, at which the gauge plate is about coplanar with the edge of the blade, to an open position, at which food product can be sliced.

The food product carriage is mounted for reciprocation in the housing. The food product carriage comprises a base, a support which is removably mounted on the base and a tray. The carriage support is pivotally mounted on the base in a mounting head. The mounting head is linked to a plunging element which is biased inwardly toward the housing by a spring. The plunging element translates with movement of the carriage support between a retracted position and an extended position at which the carriage is removable from the housing for cleaning.

To limit access to the slicing blade while the carriage support is moved away from the housing and the gauge plate is opened, the slicer incorporates an interlock mechanism. The interlock mechanism prevents the carriage support from being pivoted away from the housing by preventing translation of the plunging element when the gauge plate is in an open position. When the gauge plate is in the closed position, the interlock mechanism allows the carriage to be pivoted away from the housing and prevents the gauge plate from being opened.

The interlock mechanism includes an interlock bar, which extends along a portion of the path of reciprocation of the carriage, and an interlock plate. The portion of the path of reciprocation of the carriage not covered by the interlock bar is covered by the interlock plate. The interlock plate is pivotally mounted on the housing such that it is movable from a position at which it blocks translation of the plunging element to a position at which it allows translation of the plunging element. The interlock plate cooperates with the adjustment mechanism such that when the gauge plate is in the open position, the interlock plate is in position to prevent translation of the plunging element. When the gauge plate is in the closed position, the interlock plate moves to a position at which it does not impede translation of the plunging element.

In a preferred embodiment, the adjustment mechanism includes a cam and a knuckle formed on the interlock plate. The knuckle interacts with the cam such that when the gauge plate is in the open position, the knuckle maintains the interlock plate in position to block translation of the plunging element. When the gauge plate is closed, the knuckle interacts with a recess in the cam to allow the interlock plate to move to a position at which it does not block translation of the plunging element.

To remove the carriage support from the slicing machine, the gauge plate must be closed and the carriage must be moved to the end of the housing on which the adjustment knob is mounted. This end of the apparatus is commonly known as the operator end of the apparatus. The carriage support and tray can then be removed from the carriage by rocking the carriage support away from the housing and lifting the carriage support from the carriage. When the carriage support is removed from the slicer, an interlock is established which prevents the gauge plate from being opened unless the carriage support is replaced in the mounting head and the head is pivoted toward the housing. As the carriage support is being removed, the plunging element is translated beneath the interlock plate. When the plunging element is underneath the interlock plate, the interlock plate is biased into engagement with the means for adjustment so that it prevents the means for adjustment from being moved. A spring, which abuts the plunging element and the casting of the carriage base, exerts an inward axial force toward the housing on the plunging element. The force exerted by the spring is strong enough to prevent the plunging element from being withdrawn from underneath the interlock plate by hand. Once the carriage support is replaced on the housing, the leverage generated by moving the carriage into position on the housing causes the plunging element to be removed from the interlock position.

In the preferred embodiment, as stated above, the knuckle on the interlock plate engages a recess in the cam, which is part of the means for adjustment. When the plunging element is beneath the interlock plate, the knuckle is biased toward and into contact with the recess. The positioning of the knuckle in the recess prevents the cam from being moved. Once the plunging element is removed from beneath the interlock plate, the cam can be moved to adjust the gauge plate. As the cam is being moved, the knuckle moves out of contact with the recess to ride along the peripheral surface of the cam. As the knuckle rides on the peripheral surface of the cam, the interlock is maintained in a position at which it blocks translation of the plunging element.

In an alternate embodiment, the adjustment mechanism of the food product slicer can include an alternate cam which provides for easier adjustment of the gauge plate. The alternate cam requires the operator to turn the cam for more than one revolution before the gauge plate is located at its position farthest from the slicing blade. To allow the alternate cam to function with the interlock of this invention, a groove is formed in the peripheral surface of the alternate cam. A pin extending from an arm, which is pivotally mounted on the interlock plate, rides in the groove and prevents the knuckle on the interlock plate from engaging the recess on the alternate cam when the gauge plate is in an opened position. When the gauge plate is in the closed position, the pin moves into an aperture at one end of the groove in the alternate cam which allows the knuckle to move into the recess which, in turn, allows the interlock plate to move out of a position which blocks translation of the plunging element.

In still another alternate embodiment of this invention, the slicer interlock may additionally include a slicing blade deactivation mechanism which shuts off the motor for the slicing blade when the carriage is removed. The switch mechanism includes an actuator, one end of which is mounted in the plunging element. When the plunging element is moved to a position beneath the interlock plate, the actuator contacts a switch which is mounted on a bracket extending from the housing. When the interlock is activated, the actuator contacts the switch to interrupt the power supply to the slicing blade motor to cause the slicing blade to stop rotating.

The novel features of this invention are set out in the appended claims. The invention, itself, however, both as to its construction and method of operation, is best understood from the following detailed description when read in conjunction with the accompanying drawings.

DETAILED DESCRIPTION OF THE INVENTION

Figure 1:
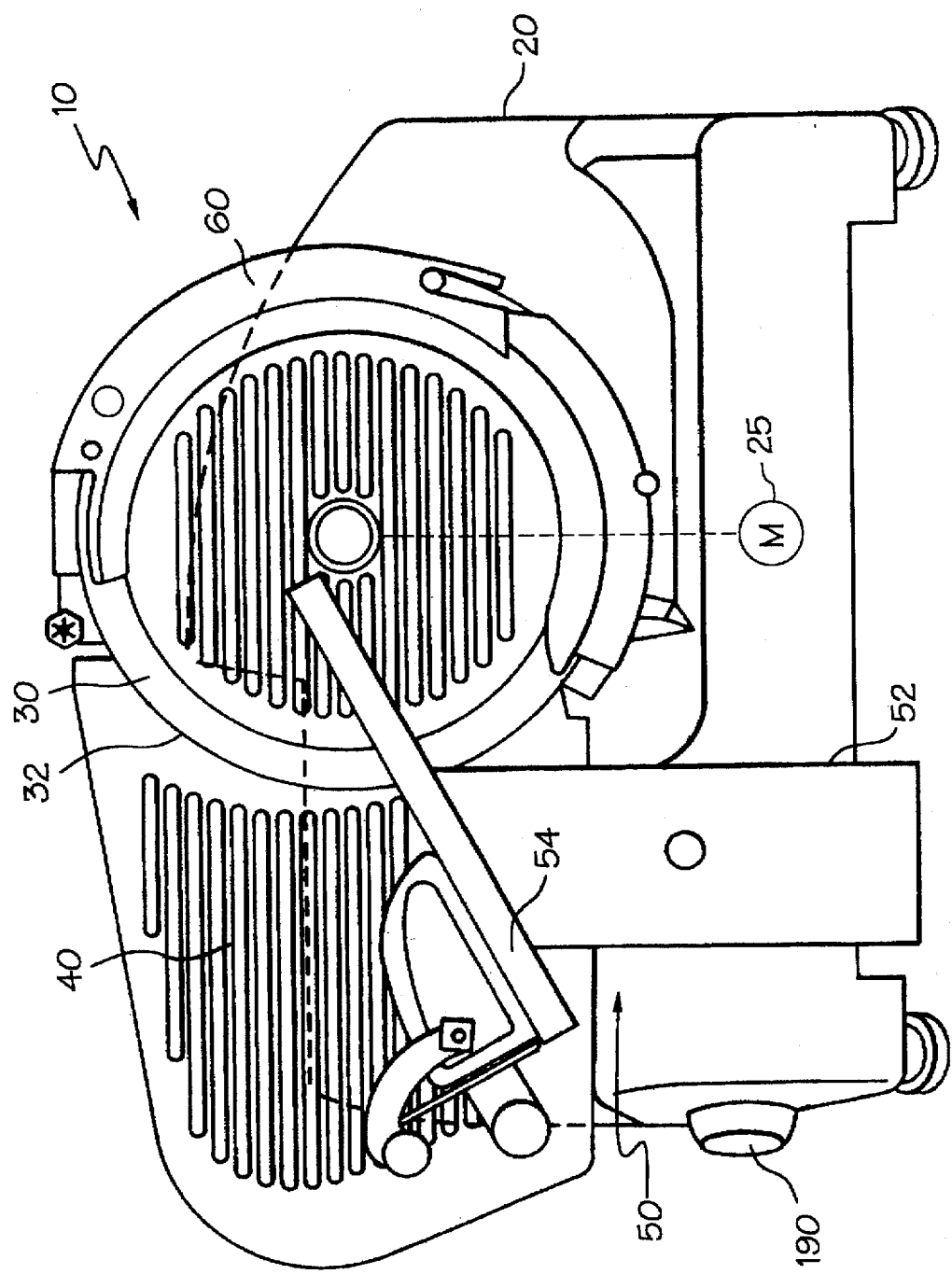
FIG. 1 is a perspective view of a food product slicer which employs the interlock mechanism of this invention.

FIG. 1 presents a perspective view of a typical food product slicer 10 which employs the interlock mechanism of this invention. Slicer 10 includes a housing 20, a slicing blade 30, a gauge plate 40, a food product support carriage 50, a cover plate 60 and an adjustment knob 190. Slicing blade 30 and gauge plate 40 are mounted on housing 20 of slicer 10. Slicing blade 30 is journalled to a drive shaft (not shown) and is rotated by a motor 25 which is mounted in housing 20. Gauge plate 40 is adjustable toward and away from slicing blade 30 by a means for adjustment (not shown) to set the thickness of a food product slice. Food product carriage 50 is mounted for reciprocation on housing 20 so that it can move food product to be sliced over blade 30. Carriage 50 can be reciprocated either manually by the machine operator or driven by a motor in the case of an automatic slicer. Food product carriage 50 includes a carriage support 52 and a tray 54 mounted on support 52. Cover plate 60 is removably mounted on slicer 10 over blade 30.

Gauge plate 40 is moveable axially with respect to the plane of blade 30 to establish the thickness of a slice. The thickness of a particular slice of a food product is determined by the distance between slicing blade 30 and gauge plate 40. Gauge plate 40 is moved toward and away from the surface of slicing blade 30 by a conventional means for adjustment, which is not shown. Adjustment knob 190 is rotatably mounted on housing 20 and is used to operate the means for adjustment to move gauge plate 40.

When gauge plate 40 is adjusted to establish a slice thickness, it is referred to as being "open." Gauge plate 40 can also be located at a "closed" position at which the slice thickness setting is zero and gauge plate 40 covers that portion of the periphery of blade edge 32 which is usually exposed during a cutting operation. In the closed position, gauge plate 40 is typically either coplanar with or slightly raised above the plane of slicing blade 30. Gauge plate 40 covers approximately one-third of peripheral edge 32 of slicing blade 30 when set at the closed position. The remainder of the circumference of peripheral edge 32 may be covered by a ring guard (not shown) which covers the edge of blade 30 not covered by gauge plate 40.

Figure 2:
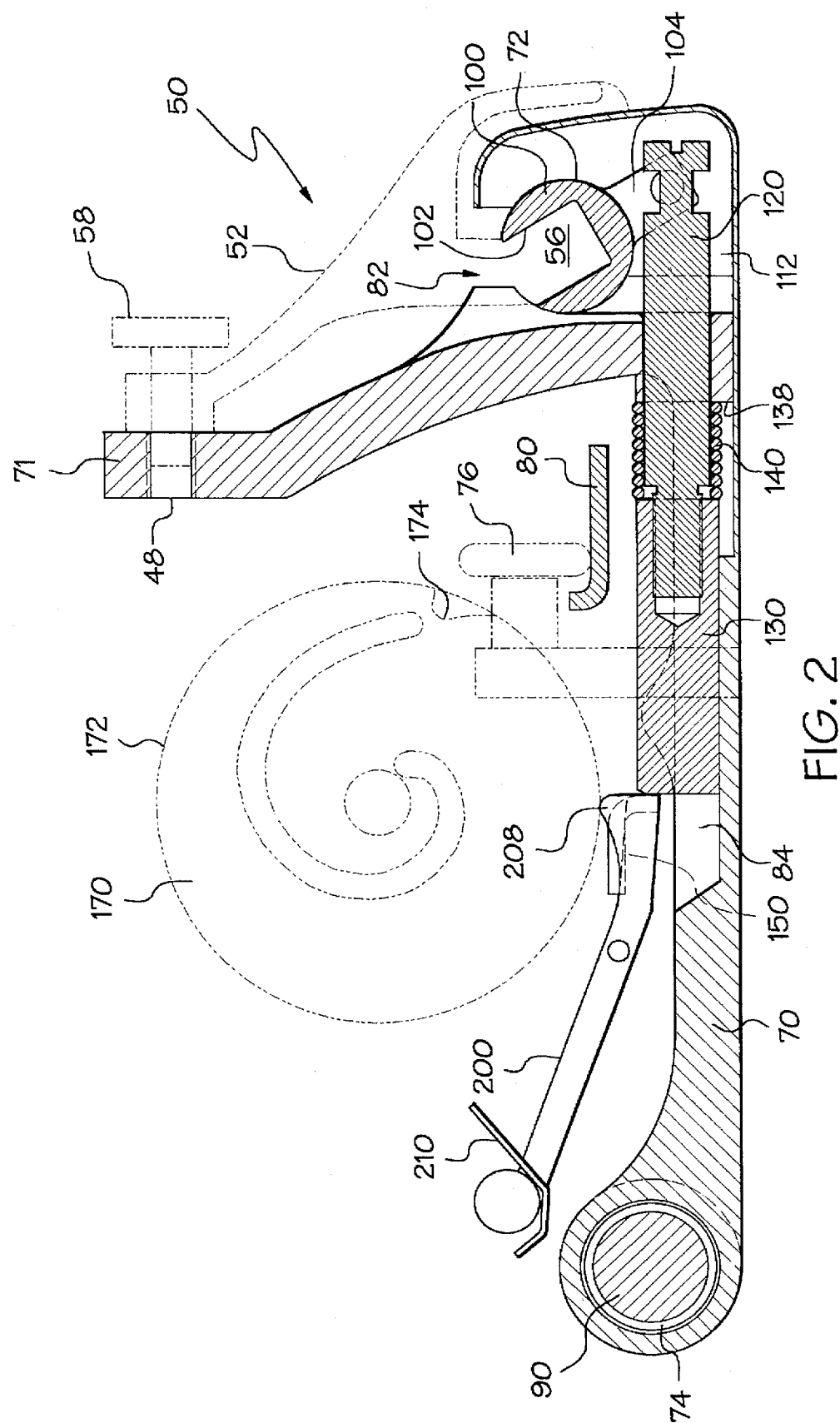
FIG. 2 is a cross-sectional view of the interlock mechanism of the food product slicer when the gauge plate is in an open position.

FIG. 2 presents a cross sectional view of the interlock mechanism when the gauge plate is in an open position. As shown in FIG. 2, carriage 50 comprises a first carriage support 52, a base 70 and a second leg 71. Bracket 72 is formed in base 70. Bracket 72 pivotally receives mounting head 100 which is cylindrical. Mounting head 100 includes a square shaped mouth 102 and legs 104 and 106. Legs 104 and 106 can best be seen in FIG. 5, which is discussed in detail below. Legs 104 and 106 are located opposite mouth 102 and extend downwardly from mounting head 100. Carriage support 52 includes a foot 56 which is slidably received by mounting head 100 to mount carriage support 52 in base 70. Leg 71 extends upwardly from base 70 and is typically shaped to conform to the contour of housing 20. In its end opposite base 70, leg 71 includes an aperture 48.

Carriage support 52 may optionally include fastener 58 which is threaded into aperture 48 and used to secure carriage support 52 on leg 71 so that carriage support 52 cannot be moved away from food producer slicer 10. In its upper surface, a slot 82 is formed in bracket 72. Slot 82 has a width slightly larger than that of foot 56 of carriage 50 and a width approximately equal to or slightly greater than that of mouth 102 of mounting head 100. Extension 112 is formed from the casting of base 70 and provides support for mounting head 100.

Base 70 of carriage 50 is mounted for reciprocation on track 80 and bar 90. Track 80, which has a L-shaped cross section, and bar 90, which has a circular cross section, extend the length of housing 20. Base 70 slides on bar 90 by means of a bearing 74. Wheel 76 is carried on base 70 and rides on track 80. As carriage 50 reciprocates, carriage 50 is carried on track 80 and bar 90 by means of wheel 76 and bearing 74, respectively. Although track 80 is described herein as having a rectangular cross section and bar 90 is described herein as having a circular cross section, one skilled in the art will appreciate that track 80 and bar 90 can have any cross section which facilitates operation of the slicing machine of this invention.

As can also be seen in FIG. 2, mounting head 100 is linked to a screw 120 which threadedly engages a plunging element 130. Plunging element 130 is mounted for reciprocation in slot 84 in carriage base 70. Spring 140 engages a shoulder 138 in the casting of base 70, at one end, and plunging element 130 at its other end.

FIG. 2 also presents views of cam plate 170 and interlock plate 200. Cam plate 170 has a peripheral surface 172. Recess 174 is formed in peripheral surface 172 of cam plate 170. Interlock plate 200, which is discussed in detail below, is reciprocally mounted in housing 20. Interlock plate 200 is mounted on the housing by brackets 210.

Figure 4:
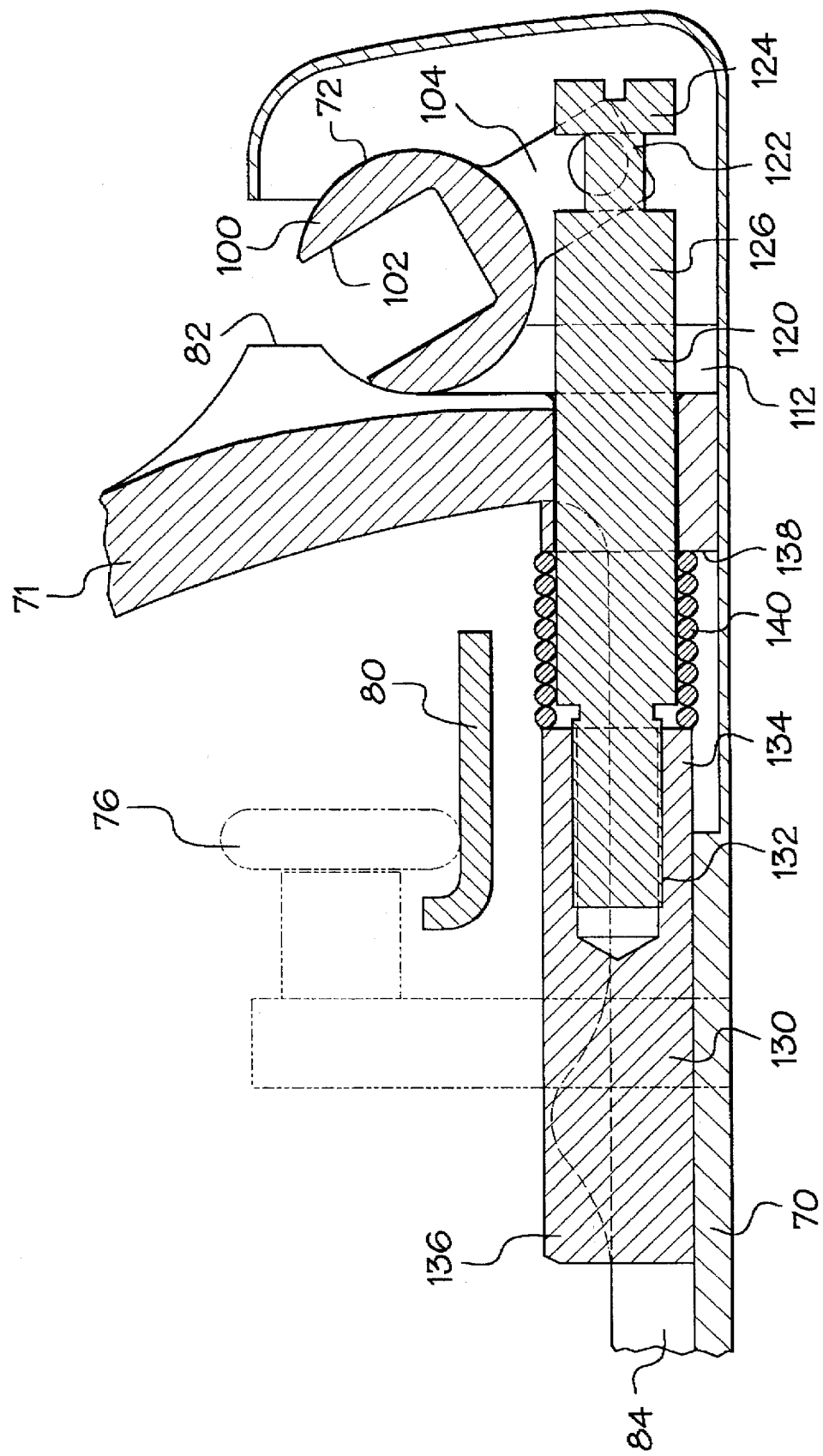
FIG. 4 is an enlarged cross-sectional view of the mounting head and plunging element of the interlock mechanism.

FIG. 4 presents an expanded cross sectional view of the mounting head and linkage portions of the interlock mechanism of this invention which is illustrated in FIG. 2. As shown in FIG. 4, mounting head 100 is rotatably mounted in bracket 72 in base 70. Mouth 102 slidably receives foot 56 of carriage support 52. Base 70 has a slot 84 machined therein. As stated above, plunging element 130 is slidably mounted in slot 84 in base 70. Plunging element 130 can have any cross sectional shape which cooperates with the operation of this invention. Preferably, plunging element 130 has a rectangular or square cross section. Plunging element 130 has a first end 134 and a second end 136. A threaded aperture 132 is machined into first end 134 of plunging element 130. Screw 120 is threadedly mounted in threaded aperture 132 in plunging element 130. Screw 120 includes a head 124, body 126 and a neck 122 which is located between head 124 and body 126. Spring 140 engages shoulder 138 in the casting of base 70 of carriage 50 at one end and plunging element 130 at a second end.

Figure 5:
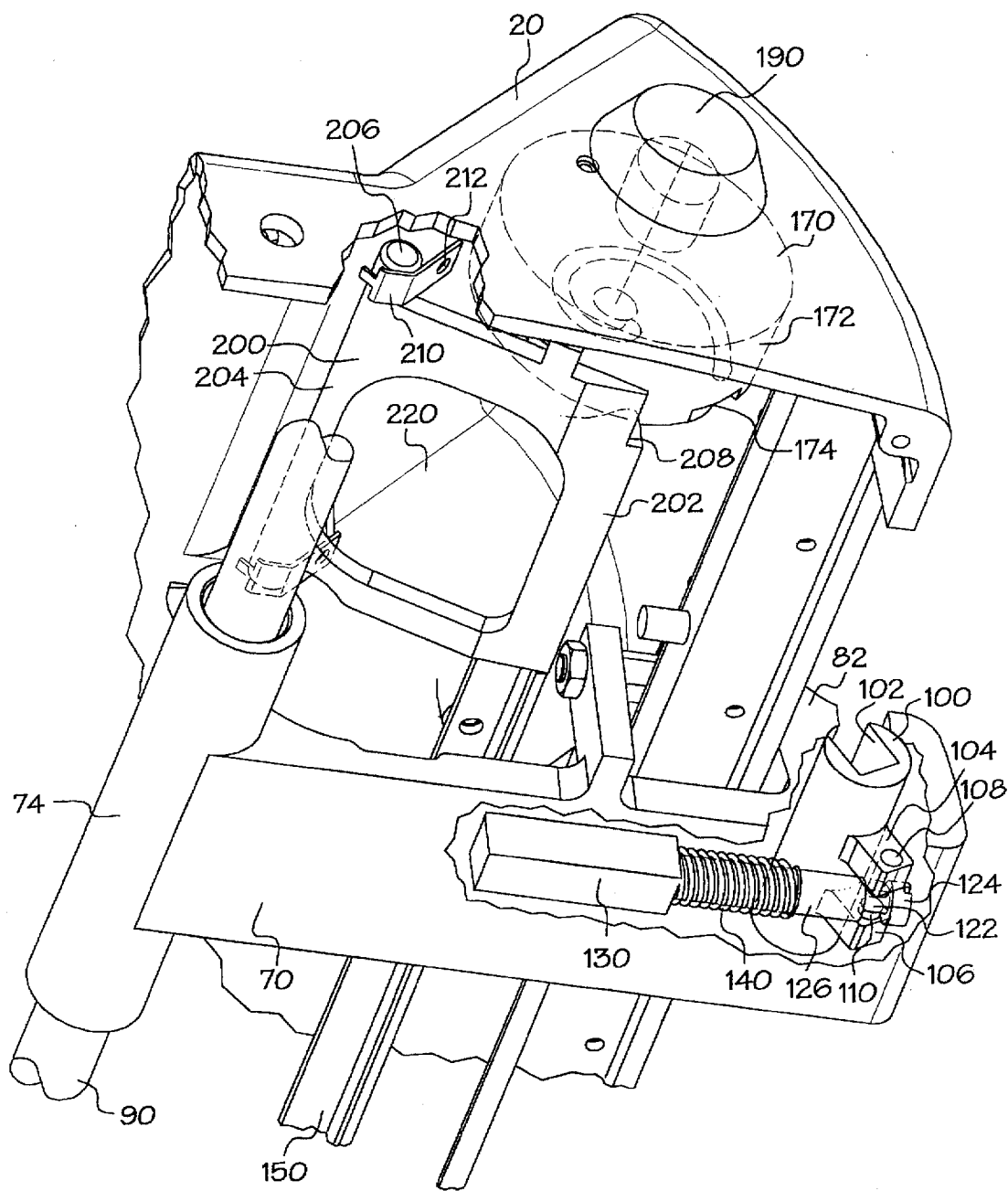
FIG. 5 is a bottom perspective view of the interlock mechanism of the food product slicer including a cutaway view of the carriage base.

FIG. 5 presents a view of the underside of housing 20 and a cutaway view of carriage base 70. As can be seen in FIG. 5, pins 108 and 110 extend from legs 104 and 106, respectively, to couple mounting head 100 to neck 122 of screw 120. The coupling arrangement between pins 108 and 110 and screw 120 allows mounting head 100 to rotate in bracket 72 without disconnecting pins 108 and 110 from neck 122 during the rotation of mounting head 100.

As can also be seen in FIG. 5, cam plate 170 is journalled to adjustment knob 190. Adjustment knob 190 moves the adjustment mechanism, not shown, which moves gauge plate 40 axially in relation to slicing blade 30 to determine the thickness of a resulting food slice. Movement of knob 190 in a first direction increases the thickness of the slice by causing gauge plate 40 to move away from slicing blade 30 and movement of adjustment knob 190 in a second direction decreases the thickness of the slice by causing gauge plate 40 to move toward slicing blade 30. When adjustment knob 190 is moved to the zero slice thickness setting, gauge plate 40 is moved to a position at which it is coplanar with slicing blade 30 or slightly raised above the surface of slicing blade 30 to prevent access to the edge of slicing blade 30.

Interlock bar 150 can also be seen in FIG. 5. As shown in FIG. 5, interlock bar 150 is mounted in housing 20 and extends over a portion of the path of displacement of carriage 50. Interlock bar 150 can have a square, rectangular or L-shaped cross section. Although described herein as having a square, rectangular or L-shaped cross section, interlock bar 150 may have any shaped cross section which would cooperate with the interlock mechanism of this invention and prohibit the translation of plunging element 130. The interlock bar 150 is shown in phantom in FIGS. 2, 3, 7 and 8.

Interlock plate 200 can also be seen in FIG. 5. As shown in FIG. 5, interlock plate 200 is rotatably mounted on the inside of housing 20. Interlock plate 200 is mounted such that it covers the remainder of the path of displacement of carriage 50 which is not covered by interlock bar 150. Interlock plate 200 includes a first end 202 and a second end 204. Legs 206 extend outwardly from second end 204 of interlock plate 200. Interlock plate 200 is pivotally mounted on housing 20 by means of brackets 210. Legs 206 engage brackets 210 which slidably engage housing 20 at one end and are fastened into position at their other ends by fasteners which engage apertures 212. A spring (not shown) biases interlock plate 200 toward and into contact with cam plate 170.

In a preferred embodiment, interlock plate 200 includes a knuckle 208 which extends from first end 202 of interlock plate 200 and rides along the peripheral edge of cam plate 170. Knuckle 208 rises from first end 202 of interlock plate 200 a distance sufficient to maintain first end 202 of interlock plate 200 in a position collinear with interlock bar 150 as knuckle engages cam plate 170. Interlock plate 200 may optionally include a center aperture 220. Center aperture 220 can be formed in interlock plate 200 to provide clearance for the adjustment mechanism of gauge plate 40, if necessary.

To facilitate cleaning of slicer 10, food product carriage 50 can be removed from housing 20. To remove carriage 50 for cleaning, adjustment knob 190 is moved to the zero slice thickness setting which moves gauge plate 40 to the closed position. Once gauge plate 40 has been closed, carriage support 52 can be moved away from housing 20. As carriage support 52 is being moved away from housing 20, mounting head 100 rotates in bracket 72. As mounting head 100 rotates in bracket 72, pins 108 and 110 in legs 104 and 106 move screw 120 forward by pushing body 126 of screw 120 toward housing 20 of slicer 10. When screw 120 is moved forward, it forces plunging element 130 toward interlock plate 200.

Figure 3:
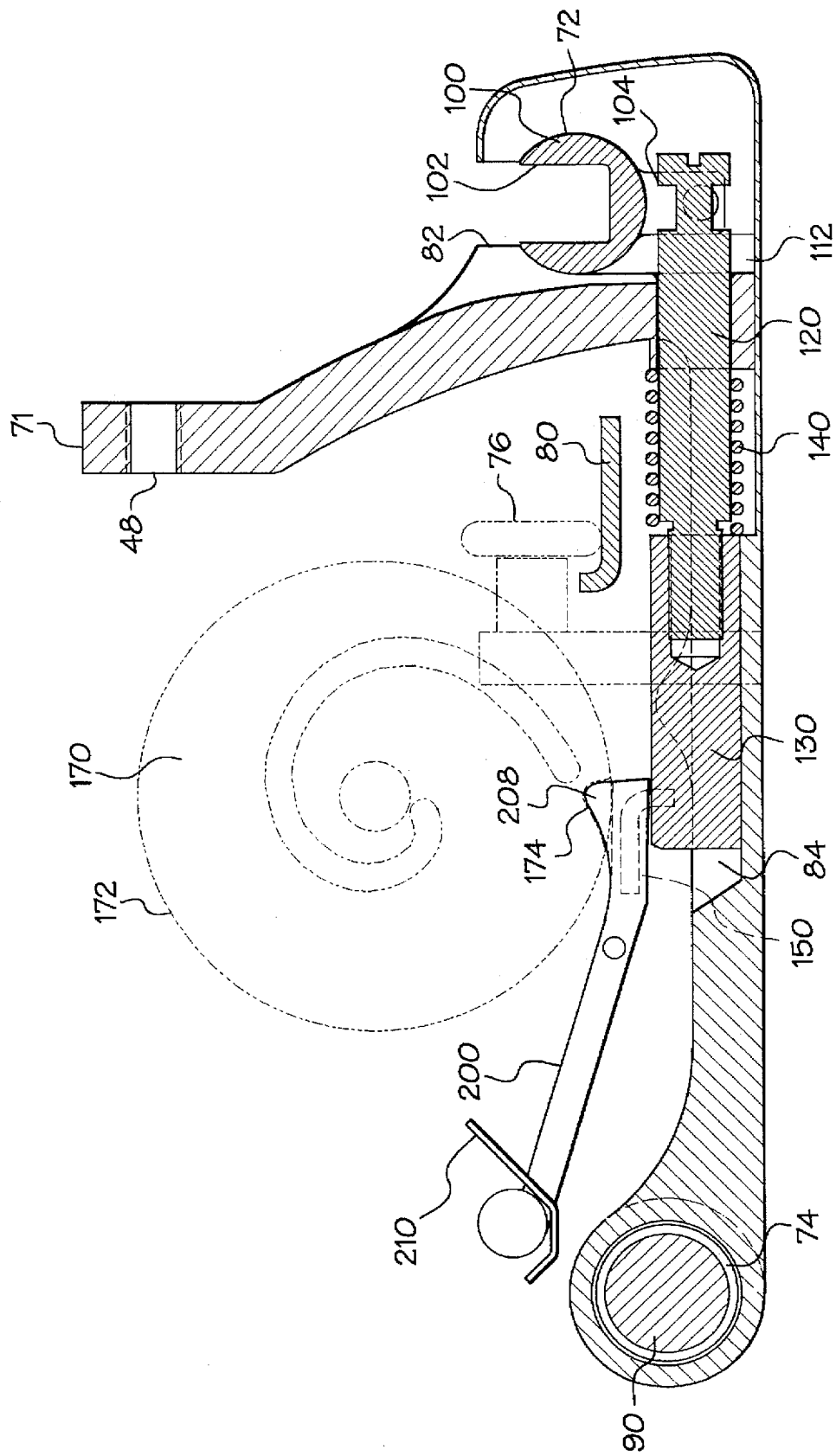
FIG. 3 is a cross-sectional view of the slicer with the interlock mechanism when the gauge plate is in the closed position.

As shown in FIG. 3, at the zero slice thickness setting, i.e. when gauge plate 40 is in the closed position, knuckle 208 on interlock plate 200 is received in recess 174 on cam plate 170. The movement of knuckle 208 into recess 174 permits the spring (not shown) to pull interlock plate 200 toward housing 20 moving interlock plate 200 to a position at which it is no longer collinear with interlock bar 150 and a clearance is provided beneath interlock plate 200 which allows second end 136 of plunging element 130 to pass beneath plate 200.

When second end 136 of plunging element 130 extends beneath plate 200, mouth 102 in mounting head 100 is moved to a position at which mouth 102 is aligned with slot 82 in carriage base 70. To prevent mounting head 100 from over-rotating and to ensure that mouth 102 properly aligns with slot 82, the extension 112 is adapted to abut legs 104 and 106, respectively, of mounting head 100. When legs 104 and 106 contact extension 112, mounting head 100 is prevented from further rotation. The contact of legs 104 and 106 with extension 112 aligns mouth 102 with slot 82. Once mouth 102 is aligned with slot 82, carriage support 52 can then be lifted vertically to remove foot 56 from mouth 102 in mounting head 100. Carriage support 52 can then be disconnected from carriage base 70 and carriage 50 and slicer 10 can be cleaned.

While carriage support 52 is removed for cleaning of slicer 10, gauge plate 40 cannot be moved from the zero slice thickness setting to expose cutting blade 30. As can be seen in FIG. 3, the extension of second end 136 of plunging element 130 below interlock plate 200 prevents interlock plate 200 from moving away from housing 20. This, in turn, prevents knuckle 208 from dislodging from recess 174 on cam plate 170 which prevents cam plate 170 from being moved by adjustment knob 190. If cam plate 170 is prevented from moving, then adjustment knob 190 and, subsequently gauge plate 40, cannot be moved from the zero slice thickness setting. Spring 140 biases plunging element 130 beneath interlock plate 200 to prevent the interlock device from easily disengaging while carriage support 52 is removed from housing 20. Spring 140 provides sufficient biasing force to maintain second end 136 of plunging element 130 beneath interlock plate 200 until carriage support 52 is replaced onto slicer 10.

Once carriage support 52 is replaced onto base 70 and second end 136 of plunging element 130 is retracted from beneath interlock plate 200, gauge plate 40 can then be moved. To return carriage 50 to a position at which slicer 10 can be operated, foot 56 must first be reinserted into mouth 102 in head 100. To remove second end 136 of plunging element 130 from beneath interlock bar 150, the operator must apply sufficient force to overcome the biasing force of spring 140. Because of the force of spring 140, mounting head 100 and plunging element 130 can only be moved when carriage support 52 has been replaced on the slicer 10. As carriage support 52 is rotated toward housing 20 of slicer 10, mounting head 100 rotates in bracket 72. As mounting head 100 rotates, plunging element 130 is removed from beneath interlock plate 200 when pins 108 and 110 in legs 104 and 106 on head 100 pull screw 120 laterally away from the inside of housing 200. Once carriage support 52 has been replaced, carriage support 52 can be secured into position on leg 71 by threading knob 58 into aperture 48.

Once plunging element 130 is removed from beneath interlock plate 200, cam plate 170 can be rotated by adjustment knob 190 to dislodge knuckle 208 from recess 174 by overcoming the biasing force placed on interlock plate 200 by the spring. Once the biasing force of the spring is overcome, knuckle 208 is disengaged from recess 174 in cam plate 170 and moved to ride on peripheral edge 172, as described above. Cam plate 170 and, subsequently, adjustment knob 190 can then be moved.

When slicer 10 is in use and gauge plate 40 is in an open position, carriage support 52 and tray 54 cannot be removed from slicer 10. As stated above, knuckle 208 rides on the peripheral edge 172 of cam plate 170, which is shown in FIG. 2. As knuckle 208 rides on peripheral edge 172 of cam plate 170, knuckle 208 maintains interlock plate 200 in a position such that first end 202 is collinear with interlock bar 150. If the operator attempts to move carriage support 52 away from housing 20 while interlock plate 200 is collinear with interlock bar 150, second end 136 of plunging element 130 will abut either interlock bar 150 or interlock plate 200. The interference between plunging element 130 and either interlock bar 150 or interlock plate 200 occurs because both interlock bar 150 and interlock plate 200 do not afford second end 136 of plunging element 130 enough clearance to pass beneath themselves and move to an extended position. If second end 136 of plunging element 130 can not move to an extended position, then foot 56 of carriage support 52 cannot be removed from mouth 102 in mounting head 100 because mouth 102 cannot align with slot 82 in bracket 72. The alignment of mouth 102 with slot 82 is not possible when plunging element 130 is retracted, thus removal of carriage support 52 from mounting head 100 is prevented.

Figure 6:
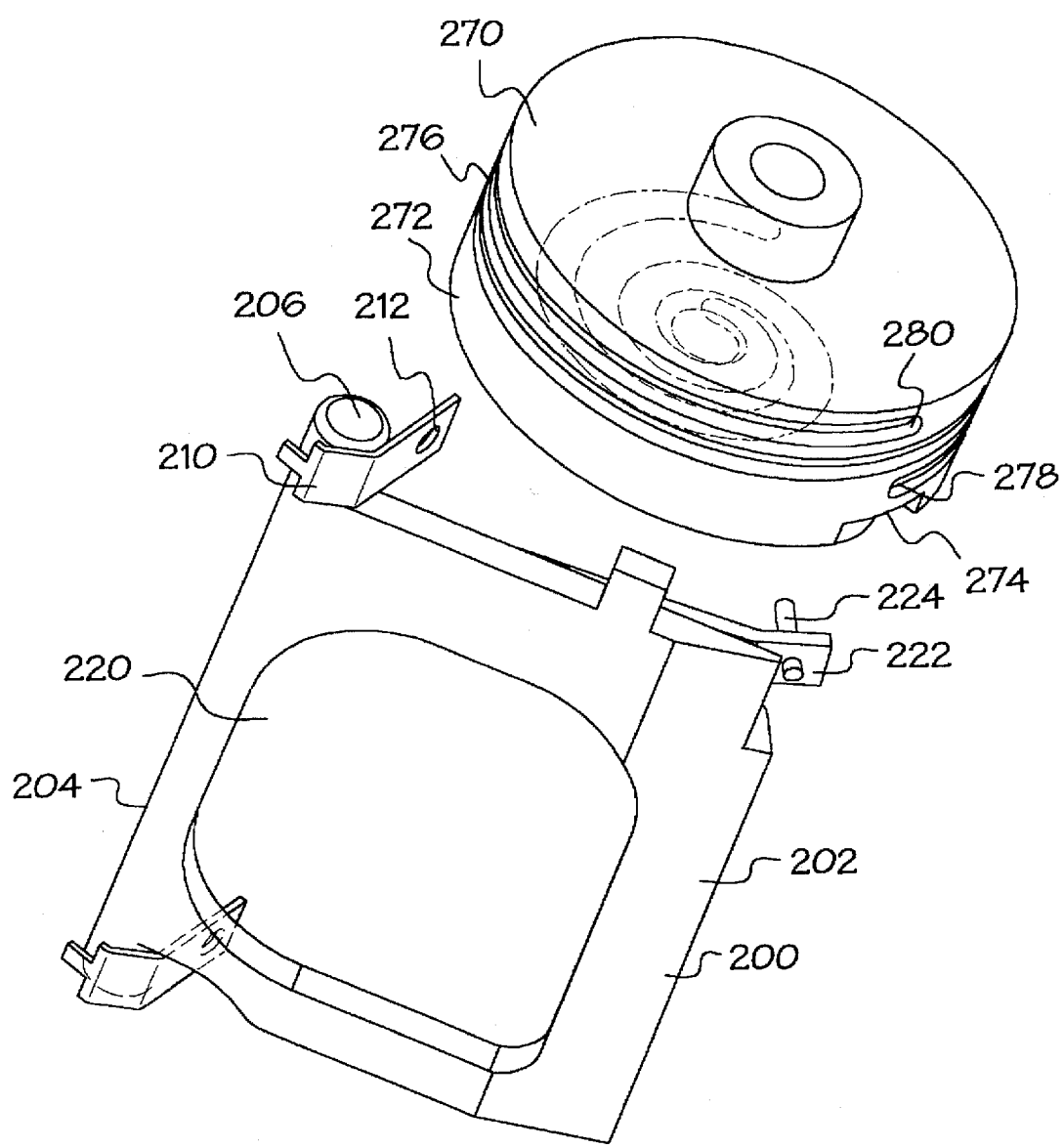
FIG. 6 is a perspective view of the cam and interlock plate of the alternate embodiment of the invention.

To facilitate adjustment of gauge plate 40, slicer 10 may be outfitted with an alternate cam arrangement which decreases the amount of torque the operator must apply to adjustment knob 190 to cause the adjustment mechanism to move gauge plate 40. With this alternate cam arrangement, which is shown in FIG. 6, cam plate 270 must be rotated more than one complete turn by adjustment knob 190 before gauge plate 40 is moved to its farthest position from slicing blade 30. With this alternate cam arrangement, the interaction of interlock plate 200 with cam plate 270 must be altered to allow cam plate 270 to complete more than one turn before the interlock mechanism is engaged.

FIG. 6 presents a perspective view of the alternate embodiment of cam plate 270 and interlock plate 200. Cam plate 270 has a peripheral surface 272 into which a recess 274 has been formed. As can be seen in FIG. 6, a groove 276 is formed into the peripheral surface 272 of cam plate 270. Preferably, groove 276 encircles the peripheral surface 272 of cam plate 270 for more than one turn of cam plate 270. Groove 276 terminates at one end in a first end 278 and terminates at its other end in aperture 280. As groove 276 approaches aperture 280, the depth of groove 276 gradually increases to equal that of aperture 280. Aperture 280 is positioned on cam plate 270 such that the position of aperture 280 is fixed with respect to the position of recess 274. The positioning of recess 274 and aperture 280 are fixed in relation to each to allow the modified interlock plate 200, as described below, to function in combination with cam plate 270.

In this alternate embodiment, arm 222 is pivotally mounted at second end 204 of interlock plate 200. A pin 224, which travels in groove 276, extends from one end of arm 222 to prevent knuckle 208 from engaging recess 274 in the peripheral surface 272 of cam plate 270 while gauge plate 40 is in an open position. Pin 224 is maintained in position in groove 276 by the biasing force provided by the spring (not shown) which biases interlock plate 200 toward housing 20.

As pin 224 travels in groove 276, it maintains interlock plate 200 in a position at which it blocks reciprocation of plunging element 130 and prevents knuckle 208 from moving into recess 274 on the peripheral surface 272 of cam plate 270. When gauge plate 40 is moved to its fully opened position, pin 224 is at first end 278 of groove 276. At this position, interlock plate 200 is positioned so that it blocks reciprocation of plunging element 130. As adjustment knob 190 is turned to rotate cam plate 270, pin 224 travels in groove 276 around peripheral surface 272 of cam plate 270. When gauge plate 40 is moved to the closed position, pin 224 engages aperture 178. When pin 224 engages aperture 280, knuckle 208 can move to engage recess 274. As described above, when knuckle 208 engages recess 274, interlock plate 200 moves to a position at which it does not block reciprocation of plunging element 130.

Once plunging element 130 has been retracted from beneath interlock plate 200 by replacing carriage 50 into slicing machine 20, as described above, gauge plate 40 can be adjusted by means of knob 190. As adjustment knob 190 is turned, knuckle 208 disengages from recess 274. As knuckle 208 moves out of recess 274, pin 224 is lifted from aperture 280. Once pin 224 contacts groove 276, knuckle 208 is prevented from contacting recess 274 and interlock plate 200 is moved to a position at which first end 202 is collinear with interlock bar 150. The remainder of the workings of the interlock mechanism are as described above.

Figure 7:
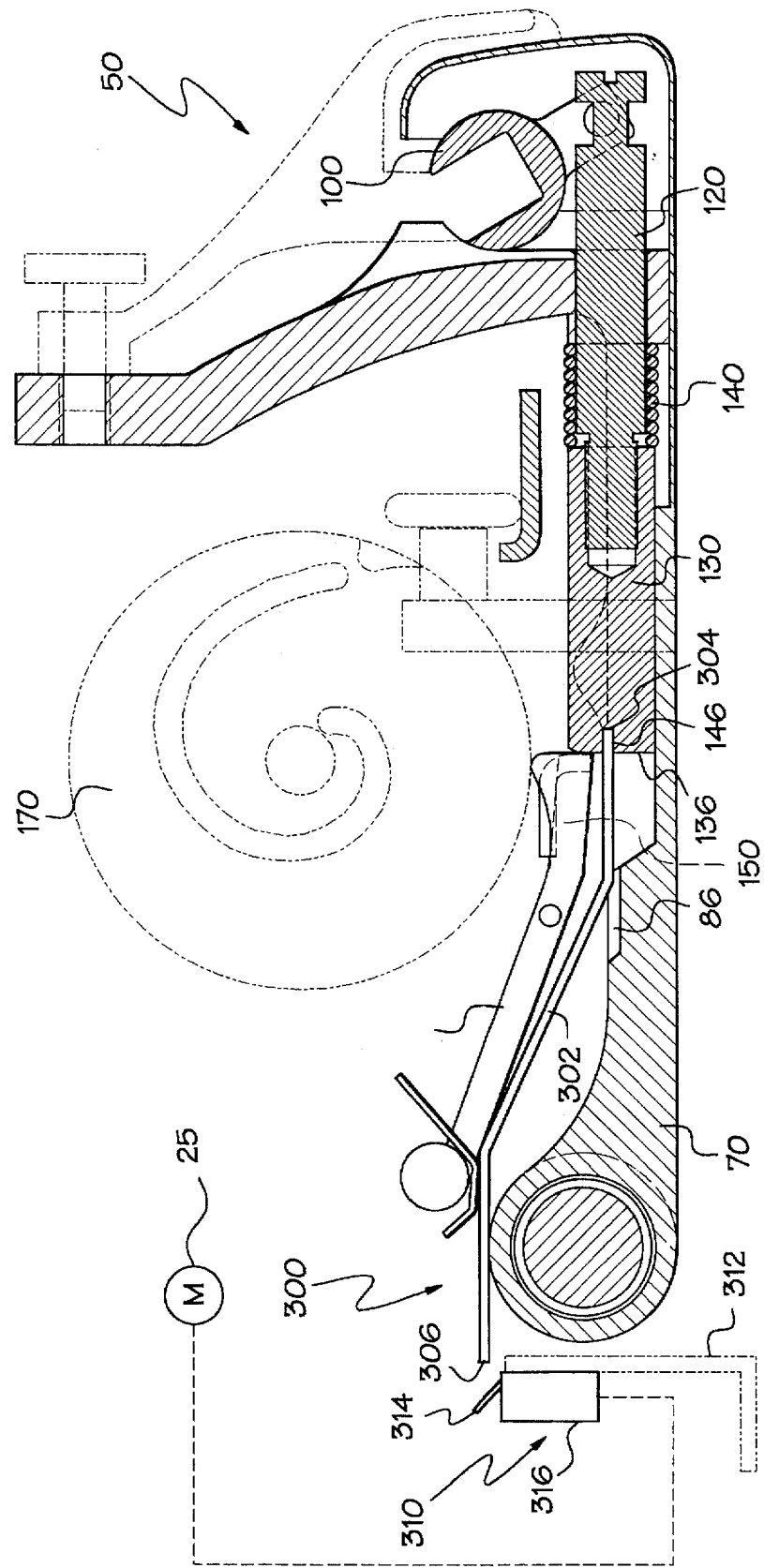
FIG. 7 is a cross-sectional view of an alternate embodiment of the interlock mechanism, which includes the slicing blade deactivation mechanism, when the gauge plate is in an open position.

In an alternate embodiment, food product slicer 10 may include a slicing blade deactivation mechanism 300. This mechanism 300 is shown in detail in FIGS. 7 and 8. As shown in FIG. 7, plunging element 130 has a slot 146 formed in second end 136. Deactivation mechanism 300 comprises an actuator 302, having a first end 304 and a second end 306, and a switch 310. First end 304 of actuator 302 is mounted in slot 146 in plunging element 130. To accommodate actuator 302, a second slot 86 is machined into base 70 of carriage 50. A bracket 312 is mounted to and extends from housing 20 Switch 310 is mounted on one end of bracket 312. Switch 310 comprises a contact 314 and a body 316. Contact 314 is reciprocally mounted on switch body 316 and spring biased away from body 316 by a spring which is not shown. As also shown in FIG. 7, when plunging element 130 is retracted, actuator 302 does not engage switch 310.

Figure 8:
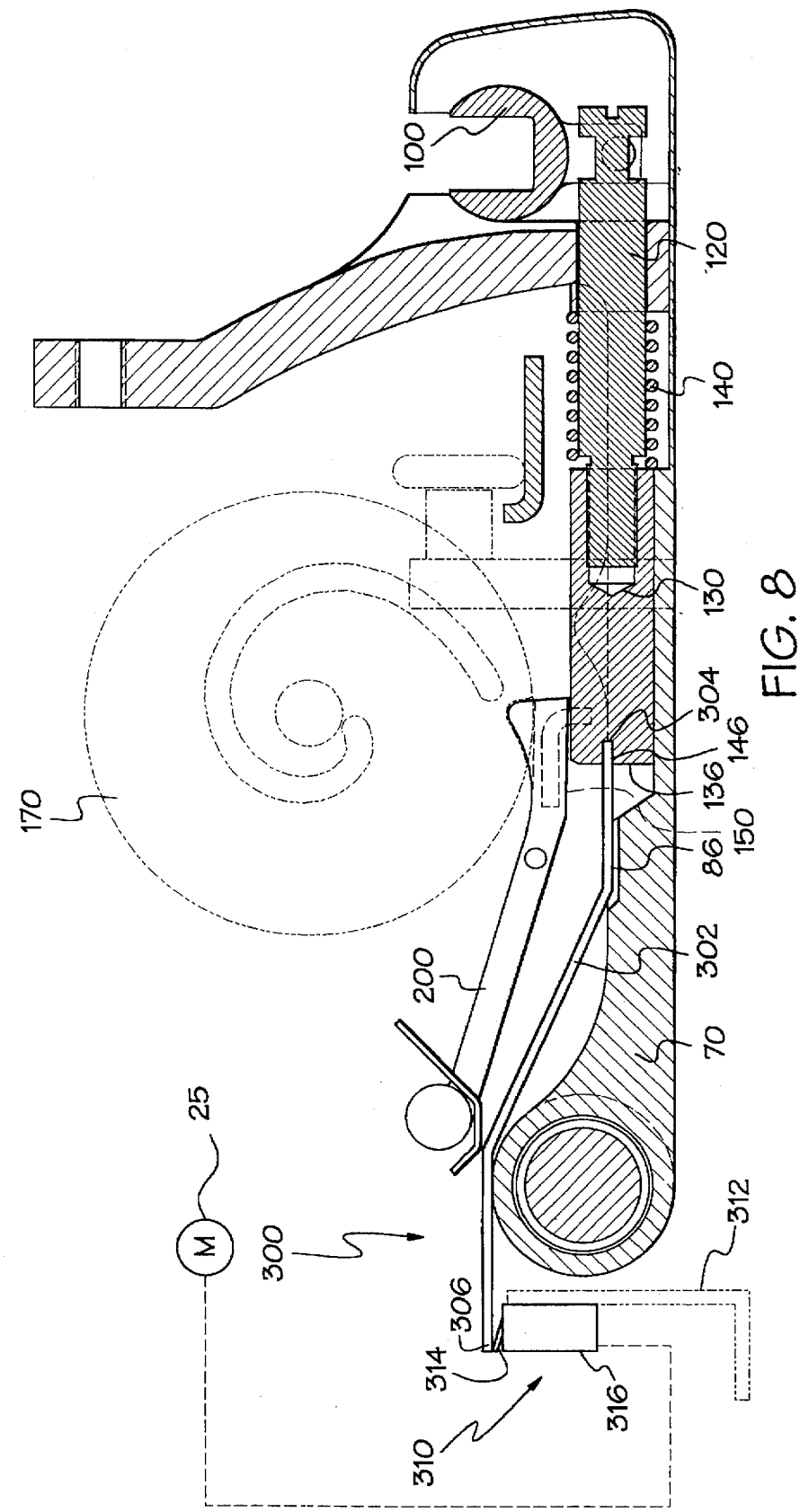
FIG. 8 is a cross-sectional view of an alternate embodiment of the interlock mechanism, which includes the slicing blade deactivation mechanism, when the gauge plate is in the closed position.

As shown in FIG. 8, when second end 136 of plunging element 130 is extended below interlock plate 200 as described above, actuator 302 engages switch 310. When switch 310 is engaged, the power supply to the motor 25 which rotates slicing blade 30 is interrupted and the motor 25 is deenergized causing slicing blade 30 to stop rotating. To engage switch 310, actuator 302 is moved toward switch 310 by extending plunging element 130, as described above. When plunging element 130 reaches a position beneath interlock plate 200, second end 306 of actuator 302 engages contact 314 of switch 310. The activation of switch 310 then causes the power supply to the slicing blade motor 25 to be interrupted. Once the power to the motor is interrupted, slicing blade 30 is shut off and the opportunity for the operator of food product slicer 10 to come into contact with a moving slicing blade 30 is reduced.

In this embodiment, actuator 302 must be withdrawn from contact with switch 310 before slicing blade 30 can be activated. To withdraw actuator 302 from contact with switch 310, plunging element 130 is retracted from beneath interlock plate 200, as described above. As plunging element 130 is retracted, second end 306 of actuator 302 is withdrawn from contact with contact 314 of switch 310. Once second end 304 of actuator 300 is withdrawn from contact 314, the power supply to the slicing blade motor 25 is no longer interrupted. To reactivate the slicing blade, the operator must reactivate the main power supply switch (not shown) for slicer 10.

One skilled in the art will appreciate that switch mechanism 300 can be employed with either embodiment of the slicing machine 10 described above. Although switch mechanism 300 is shown in FIGS. 7 and 8 as being employed with cam plate 170, switch mechanism 300 works equally as well with cam plate 270 which is shown in FIG. 6.

Having described the invention in detail, it will be apparent that numerous variations and modifications are possible without departing from the spirit and scope of the invention as defined by the following claims.

What is claimed is:

1. A food product slicer comprising:

a housing;

a slicing blade rotatably mounted on the housing;

a gauge plate, adjustable relative to the slicing blade, for setting a food product slice thickness;

a means for adjusting the gauge plate between a closed position and an open position;

a food product carriage mounted for reciprocation on the housing along a path of displacement;

a carriage support pivotally mounted on the carriage;

a plunging element, linked to the carriage support, which translates between a retracted position, and an extended position, the plunging element being translated by pivoting the carriage support;

an interlock bar stationarily mounted in the housing and extending over a first portion of the path of displacement of the carriage, the interlock bar blocking translation of the plunging element when the carriage resides in the first portion of the path of displacement, thereby preventing the carriage support from being pivoted to the extended position; and an interlock plate pivotally mounted on the housing extending over a second portion of the path of displacement not covered by the interlock bar, and being pivotable from a first position at which the interlock plate blocks translation of the plunging element to the extended position and a second position at which the interlock plate does not block translation of the plunging element to the extended position, the interlock plate cooperating with the means for adjusting the gauge plate such that when the means for adjusting the gauge plate moves the gauge plate to the open position, the interlock plate is in the first position and when the means for adjusting the gauge plate moves the gauge plate to the closed position, the interlock plate is in the second position.

2. The food product slicer of claim 1 wherein the means for adjusting the gauge plate includes a circular cam plate having a peripheral surface and a recess in the peripheral surface, and the interlock plate includes a knuckle which travels along the peripheral surface of the cam plate as the gauge plate is adjusted and the knuckle is received in the recess in the cam plate when the gauge plate is closed, allowing the interlock plate to move to the second position.

3. The food product slicer of claim 2 further comprising:

a foot on the carriage support;

a bracket in the carriage, the bracket having an opening therein; and a mounting head rotatably received in the bracket, the mounting head having a slot therein for receiving the foot, the mounting head being linked to the plunging element such that the slot of the mounting head is aligned with the opening of the bracket when the plunging element is in the retracted position and such that the slot of the mounting head is not aligned with the opening of the bracket when the plunging element is in the extended position;

the foot of the carriage being removable from the slot of the mounting head when the slot of the mounting head and the opening of the bracket are aligned, and the foot of the carriage not being removable from the slot of the mounting head when the slot of the mounting head and the opening are not aligned;

whereby, the carriage support can only be removed from the mounting head when the gauge plate is in the closed position, causing the interlock plate to be in the second position, and when the carriage resides in the second portion of the path of displacement.

4. The food product slicer of claim 3 further including an arm which is pivotally mounted on the interlock plate and a pin mounted on the arm, the cam plate further including a spiral groove formed in the peripheral surface of the cam plate such that the pin engages and travels in the spiral groove as the adjustment mechanism is moved.

5. The food product slicer of claim 4 wherein the spiral groove includes, at a first end, an aperture that the pin secures within when the gauge plate is in the closed position.

6. The food product slicer of claim 5 further comprising:

a motor for rotatably driving the slicing blade; and a switch mechanism which includes an actuator mounted on the plunging element, and a motor shut-off switch, wherein the actuator engages with the switch, and in turn shuts off the motor, when the plunging element is moved to the extended position.

7. The food product slicer of claim 6 wherein the interlock bar has an L-shaped cross section.

8. The food product slicer of claim 1 further comprising:

a motor for rotatably driving the slicing blade; and a switch mechanism which includes an actuator mounted on the plunging element, and a motor shut-off switch, wherein the actuator engages with the switch, and in turn shuts off the motor, when the plunging element is moved to the extended position.

9. A food product slicer comprising:

a housing;

a circular slicing blade rotatably mounted on the housing;

a gauge plate, adjustable relative to the slicing blade, for setting a product slice thickness, the gauge plate being adjustable between an open position, in which the product slice thickness is greater than zero, and a closed position, in which the product slice thickness is zero;

a cam plate linked to the gauge plate for adjusting the gauge plate, the cam plate having a peripheral surface and a recess in the peripheral surface;

a removable carriage support having a foot;

a food product carriage mounted for reciprocation on the housing along a path of displacement;

a bracket on the carriage having a mounting head rotatably received therein, the mounting head and the bracket having slots therein which are alignable with one another such that when the slots are aligned, the foot of the carriage support can be inserted into or removed from the mounting head, and when the slots are not aligned, the foot of the carriage support cannot be removed from the mounting head; and an interlock engaged by the rotation of the mounting head in the bracket, the interlock comprising a plunging element, linked to the mounting head, which translates between a retracted position and an extended position, the plunging element being translated by rotation of the mounting head;

interlock bar mounted in the housing and extending over a first portion of the path of displacement of the carriage, the interlock bar blocking translation of the plunging element thereby preventing the plunging element from being translated to the extended position;

an interlock plate pivotally mounted on the housing, the interlock plate extending over a second portion of the path of displacement not covered by the interlock bar and being pivotable from a first position at which it blocks translation of the plunging element to the extended position, and a second position at which it does not block translation of the plunging element to the extended position; and a knuckle extending from the interlock plate, the knuckle cooperating with the cam plate such that when the gauge plate is in the open position, the knuckle rides along the peripheral surface of the cam plate maintaining the interlock plate in the first position, and when the gauge plate is in the closed position, the knuckle engages the recess allowing the interlock plate to pivot to the second position.

10. The food product slicer of claim 9 further including an arm which is pivotally mounted on the interlock plate and a pin mounted on the arm, and the cam plate further including a spiral groove formed in the peripheral surface of the cam plate such that the pin engages and travels in the spiral groove as the cam plate is moved, the spiral groove including, at one end, an aperture for receiving and substantially securing the pin when the gauge plate is in the closed position.

11. The food product slicer of claim 10 further comprising:

a motor for rotatably driving the slicing blade; and a switch mechanism which includes an actuator mounted on the plunging element, and a motor shut-off switch, wherein the actuator engages with the switch, and in turn shuts off the motor, when the plunging element is moved to the extended position.

* * * * *